United States Patent [19]
Lan

[11] Patent Number: 5,971,677
[45] Date of Patent: Oct. 26, 1999

[54] CONTROL ARM SYSTEM

[76] Inventor: Lawrence Lan, 8F1, 219 Sining South Rd., Taipei, Taiwan

[21] Appl. No.: 08/670,113

[22] Filed: Jun. 25, 1996

[51] Int. Cl.[6] ..................................................... B23B 39/12
[52] U.S. Cl. ...................... 408/236; 408/237; 408/241 R
[58] Field of Search ................................. 408/236, 234, 408/237, 241 R, 110

[56] References Cited

U.S. PATENT DOCUMENTS

| | | | |
|---|---|---|---|
| 2,309,777 | 2/1943 | Kowalske | 408/236 X |
| 3,923,086 | 12/1975 | Spohn, Jr. | 408/237 X |

FOREIGN PATENT DOCUMENTS

| | | | |
|---|---|---|---|
| 706213 | 6/1931 | France | 408/236 |
| 1017081 | 12/1952 | France | 408/236 |
| 2617519 | 1/1989 | France | 408/236 |
| 2420273 | 11/1975 | Germany | 408/236 |
| 0952465 | 8/1982 | U.S.S.R. | 408/236 |

*Primary Examiner*—Daniel W. Howell
*Assistant Examiner*—Henry W. H. Tsai
*Attorney, Agent, or Firm*—Pro-Techtor International Services

[57] ABSTRACT

A control arm system, whose first support bar is passed through by a vertical post, enabling the first support bar to swivel round horizontally by any angle, the far end of the first support bar carrying a vertical rod, which in turn passes through a first link support to enable the first link support to swivel around the far end of the first support bar horizontally; while the first link support is further provided with two bolts that are mounted vertically above each other, pointing in a horizontal direction, and which serve to hold a second support bar, made of two parallel link bars of equal length, in a way that it is movable up and down with the two bolts as cardinal points, the far end of the second support bar in turn being connected to a second link support, which holds a rotary tool, being held by two bolts mounted vertically above each other, pointing in a horizontal direction, where the distance between the two bolts of the second link support and the two bolts of the first link support is equal; wherein, when the second support bar moves up and down, the rotary tool maintains a vertical orientation and, by the horizontal swiveling movement of the first support bar and the first link support may change the working position.

8 Claims, 12 Drawing Sheets

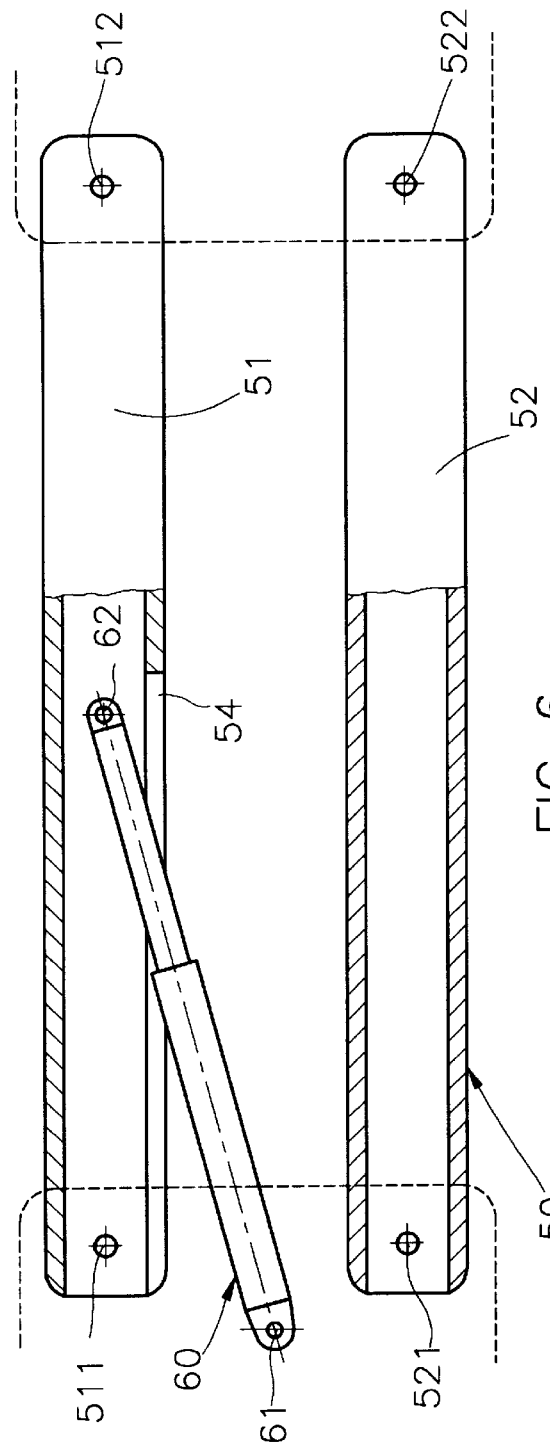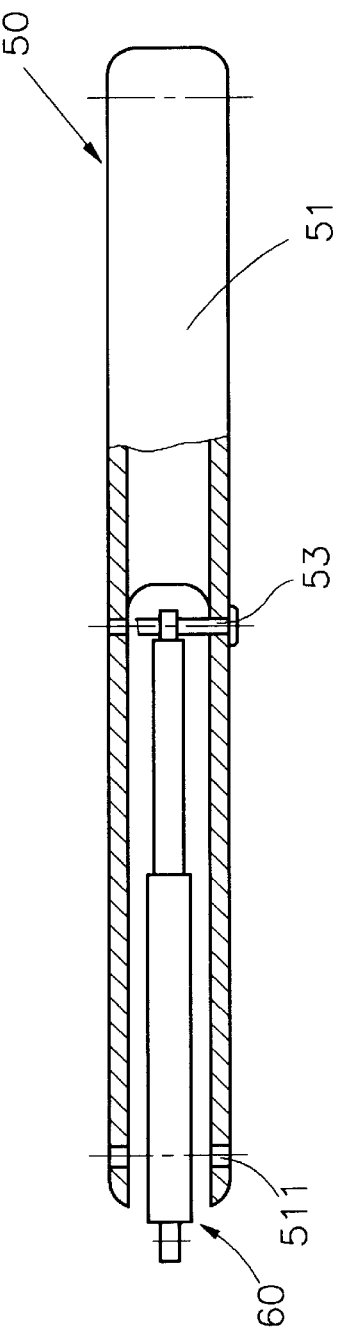

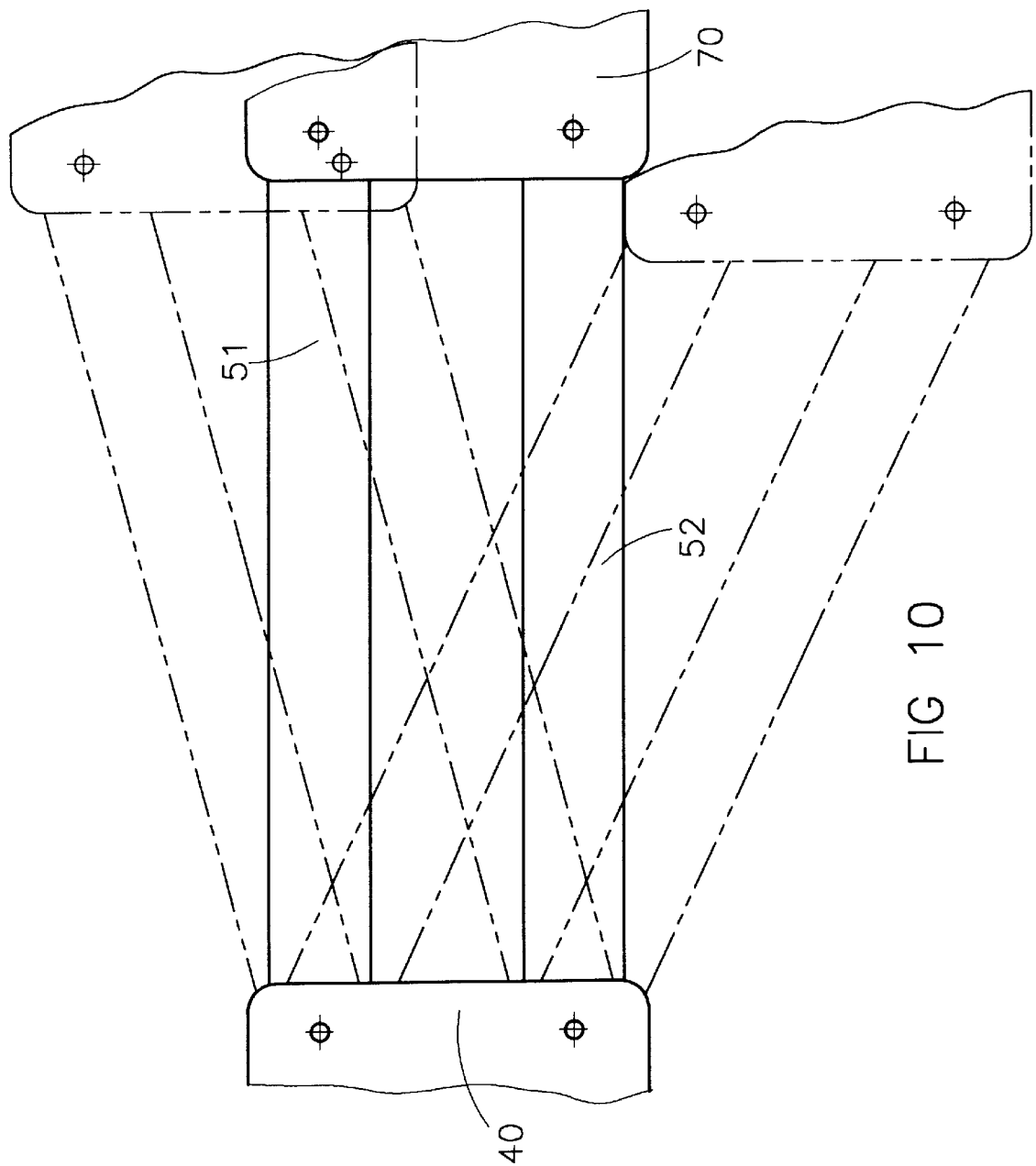

5,971,677

CONTROL ARM SYSTEM

TECHNICAL FIELD

This invention relates to a control arm system, particularly to a control arm for a work process, which allows to change the working position and provides for horizontal and vertical adjustment.

BACKGROUND OF ART

Conventional working processes on a working object in a vertical direction, like drilling, reeling, tapping, or screwing, mostly are carried out using hand-held tools. However, those tools are often not held stably by the user, especially not exactly vertically. Any torque has to be borne by the hand of the user, so no uniform force will be applied in the working process, which may cause the tool to break or even injure the user. Therefore in a working process that demands a high degree of verticality, like drilling, a fixed machine is often used. If, however, the tool is installed in a fixed position, any change in the working position is cumbersome, causing inefficient working.

Therefore, recently control arms have been used for working processes. Such a control arm is fastened to a workbench and consists of two link rods forming an L-shaped arm. A system of lockable joints allows a wide range of angular positions of the two link rods to vary the working position. On the two link rods there is also a gas vessel, which allows the control arm to separate from the working object, when the working process is finished. So a working process in a vertical direction is possible for a wide range of positions. When, however, the two link rods and the gas vessel include a small angle, they interfere with each other. So there is a blind spot in the range of possible working positions, close to the fixed end of the two link rods. Then the link rods have to be extended outward to compensate for this, leading to a bigger space consumed by the control arm.

Furthermore, when a control arm with two link rods is employed to vary the working position, there is no way to damp the horizontal reacting force at high rotational velocities of the tool. So vibrations develop, leading to less stability and making control difficult.

Moreover, when the working position is changed, the two link rods have to be folded to a smaller angle. Then the gas vessel is compressed, and the gas vessel exerts a counteracting force, which the user has to overcome, thus making the change of the working position troublesome.

SUMMARY OF THE INVENTION

An objective of this invention consists in providing a control arm system, which is almost without any blind spot.

A further objective of this invention consists in providing a control arm system of high stability, which is easy to control.

A further objective of this invention consists in providing a control arm system, which efficiently provides for horizontal and vertical adjustment.

A further objective of this invention consists in providing a control arm system, which is adjustable to any working position, while saving physical effort.

A further objective of this invention consists in providing a control arm system of simple structure, which can be easily assembled.

A further objective of this invention consists in providing a control arm system, which is transported easily and which saves space.

These objectives as well as further advantages will become apparent by the following description and claims, taken in conjunction with the accompanying drawings.

BRIEF DESCRIPTION OF THE DRAWINGS

FIG. 6 is an elevational view of the second support arm of this invention's control arm system to show the installation of the second support arm.

FIG. 7 is a top view of the second support bar of this invention's control arm system.

FIG. 10 is a schematic illustration of the movement up and down of the second support bar of this invention's control arm system to demonstrate how the second support bar's moving end stays vertical.

BEST MODE TO CARRY OUT THE INVENTION

Figure 1:
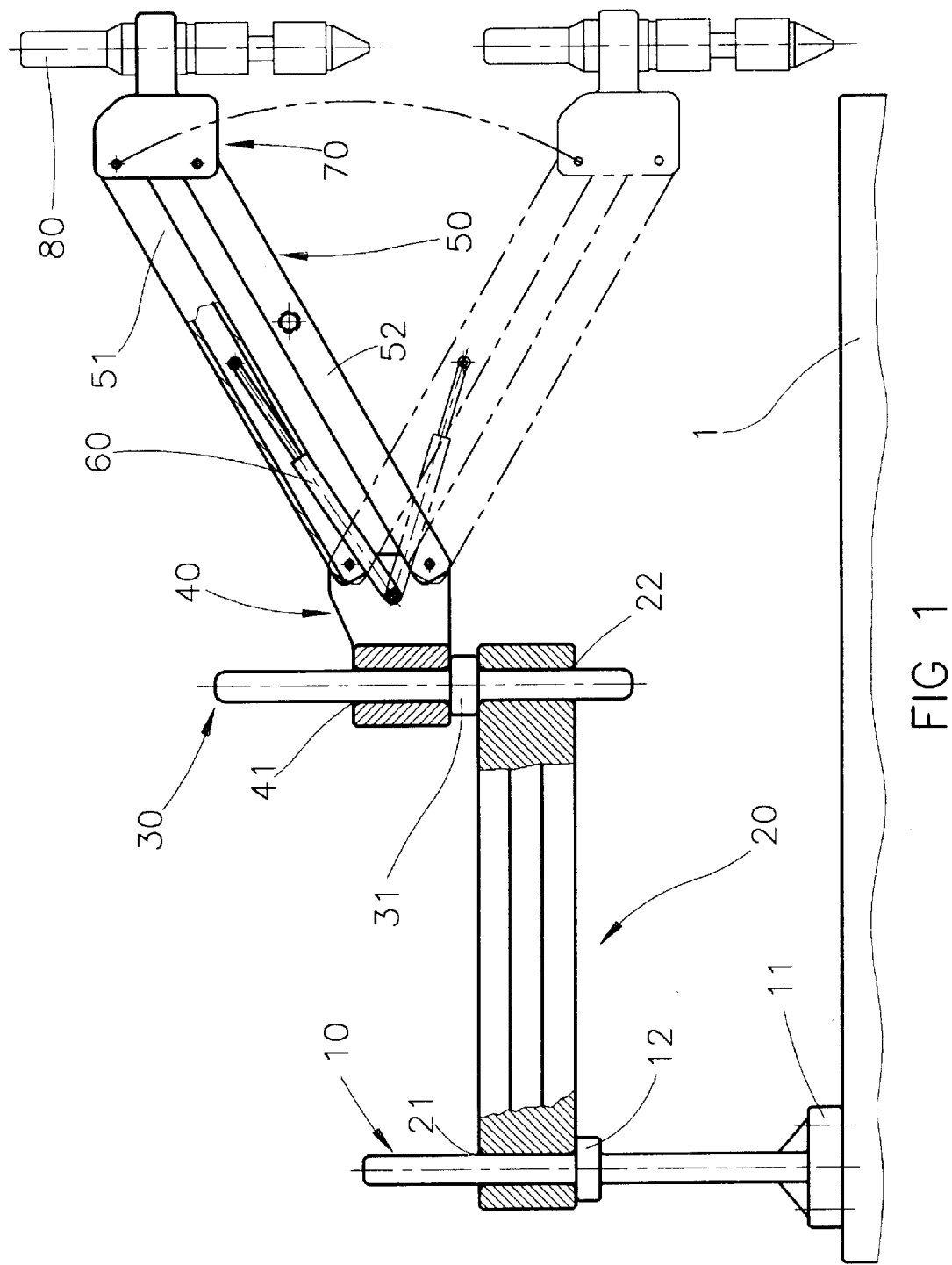
FIG. 1 is an elevational view to show the assembly of the parts of this invention's control arm system.

As shown in every figure, this invention's control arm system has a vertical post 10, which is fastened to a workbench 1. On the vertical post 10 a first support bar 20 is mounted so as to swivel round horizontally in all directions. The first support bar 20 carries a vertical rod 30, on which in turn a first link support 40 is horizontally rotatably mounted in a way that any angle between the first support bar 20 and the first link support 40 is possible. On the first link support 40 a second support bar 50 is mounted, which is movable up- and downward by a certain angle. So the control arm allows, by way of the independent swiveling of the first support bar 20 and the first link support 40, to work in a vertical direction on a working object within the full range given by its radius.

As shown in FIG. 1, the vertical post 10 is a long, upright rod, which is fastened to a base 11. The base 11 is fastened to the workbench 1 at a location suitable for the working position and range. On the vertical post 10, about at half height, there is a protruding edge 12, which carries the first support bar 20, determining its height level.

The first support bar 20 extends horizontally away from the vertical post 10. On each end it is provided with a hole 21, 22. Each hole 21, 22 is bored vertically through the first support bar 20. The vertical post 10 passes through hole 21, such that the first support bar 20 will swivel around it in the horizontal plane. On the far end of the first support bar 20 the vertical rod 30 passes through hole 22, being the axis of another swiveling movement. In order to save physical effort while swiveling, both holes 21 and 22 are provided with self-lubricating bearings or ball-bearings.

The vertical rod 30 is also a long, upright rod. Its lower end passes rotatably through hole 22 of the first support bar 20. On the vertical rod 30, about at half height, there is a protruding edge 31 just above hole 22 of the first support bar 20, such that the vertical rod 30 will not fall through hole 22. The vertical rod 30 extends further upwards to carry the first link support 40. So the first link support 40 is installed rotatably and may assume any angle with respect to the first support bar 20.

Figure 5:
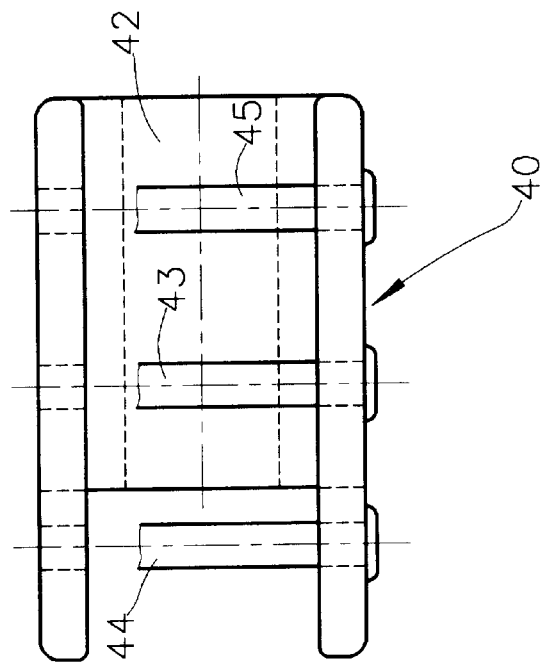
FIG. 5 is a side view from the right of the first link support of this invention's control arm system.
Figure 4:
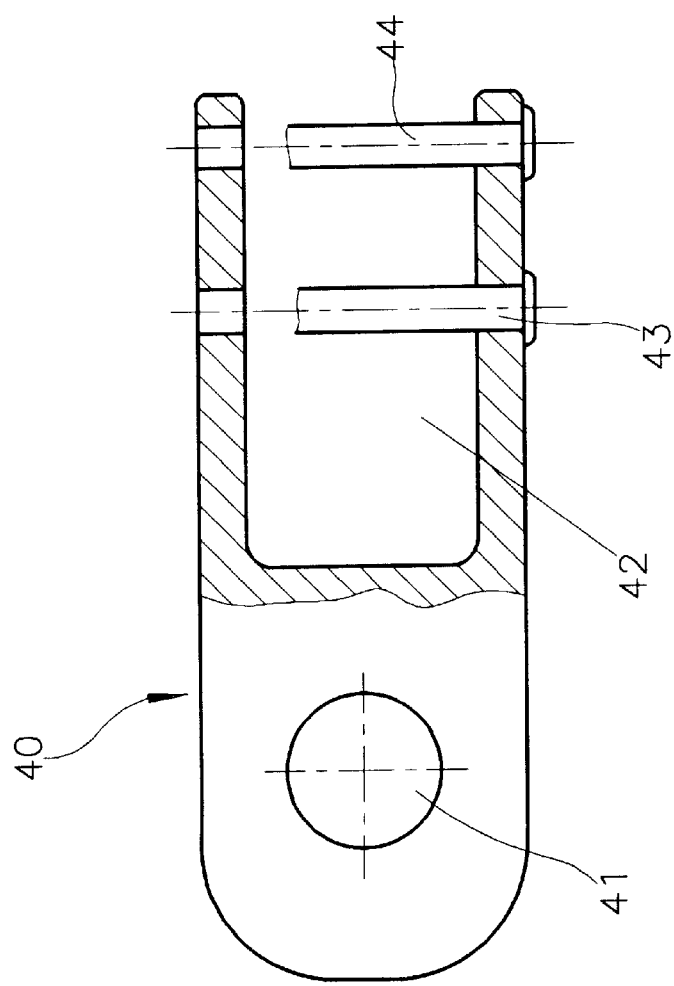
FIG. 4 is a top view of the first link support of this invention's control arm system.

As shown in FIGS. 1, 4 and 5, the first link support 40 is of roughly rectangular shape. Its one end is provided with a hole 41, which is bored vertically through. The vertical rod 30 passes rotatably through hole 41, such that the first link support 40 will swivel around it in the horizontal plane by any angle. Hole 41 is provided with self-lubricating bearings or ball-bearings to save physical effort at that movement. From the other end of the first link support 40 an opening 42 is cut up to a certain distance from hole 41. The opening 42 serves to accommodate the second support bar 50 and its vertical angular movement. Across the opening 42, perpendicular to the sides left by the opening 42, a fastening pin 43 is inserted to hold a counterforce element 60 (further explained below). Also across the opening 42, parallel to the workbench 1, there are two bolts 44 and 45 vertically above each other. Bolts 44 and 45 serves as hinges carrying the second support bar 50, allowing it to move up and down, while at the same time being able to swivel horizontally around the vertical rod 30.

As shown in FIGS. 1, 6 and 7, the second support bar 50 mainly consists of an upper and a lower link bar 51 and 52 of equal length. Upper and lower link bar 51 and 52 are mounted parallel to each other. The lower link bar 52 is on each end provided with a hole 521, 522, each of them passing horizontally through one end. Bolt 45 of the first link support 40 passes through hole 521, while hole 522 on the other end of the lower link bar 52 is connected to a second link support 70. Likewise, the upper link bar 51 is on each end provided with a hole 511, 512, each of them passing horizontally through one end. Holes 511 and 512 are bored corresponding to holes 521 and 522 of the lower link bar 52, the distance between holes 511 and 512 being equal to the distance between holes 521 and 522. Bolt 44 of the first link support 40 passes through hole 511, while hole 512 on the other end of the lower link bar 52 is connected to the second link support 70. The second link support 70 allows the upper and the lower link bar 51 and 52 to move parallel up and down.

Figure 9:
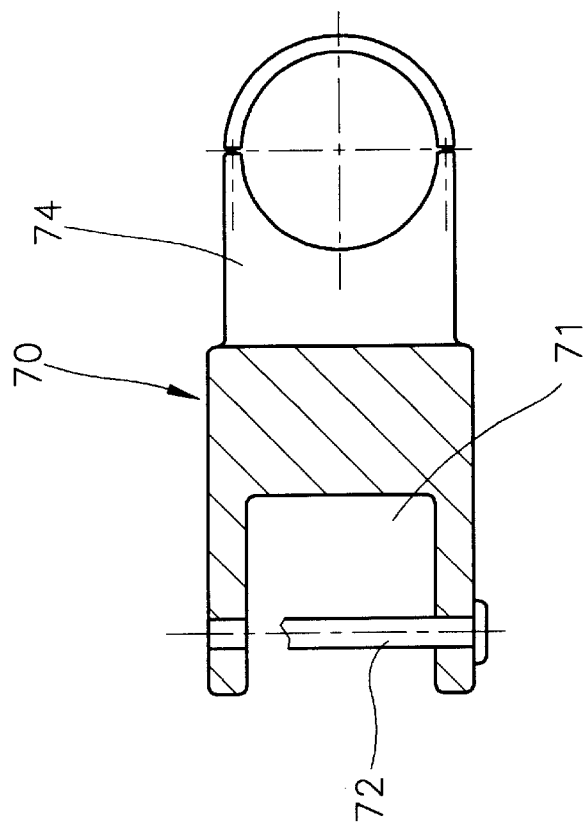
FIG. 9 is a top view of the second link support of this invention's control arm system.
Figure 8:
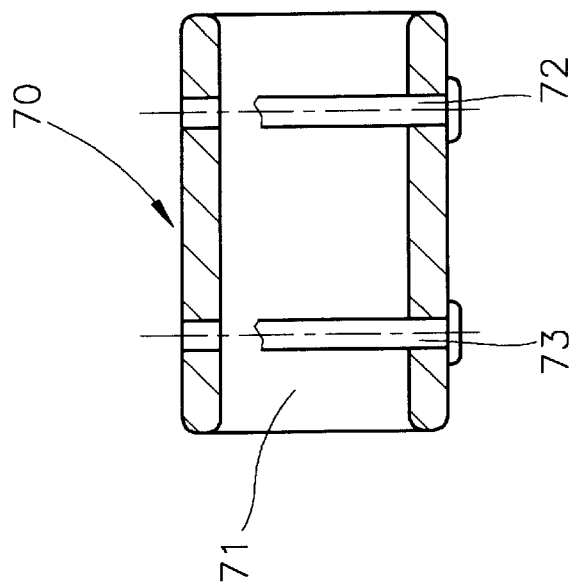
FIG. 8 is a side view from the left of the second link support of this invention's control arm system.

As shown in FIGS. 1, 8 and 9, the second link support 70 is roughly shaped as a block. The second link support 70 on the side that is opposite to the second support bar 50 is provided with a loop 74. The loop 74 holds any kind of rotary tool 80, which may be electrically driven or driven by gas or oil pressure. The rotary tool 80 works in a downward direction. (Holding the tool in the loop is a well-known technique and not described here.) Furthermore, the second link support 70 on the side of the second support bar 50 is provided with an opening 71 to accommodate the upper and the lower link 51 and 52 of the second support bar 50 with their movement up and down. Two bolts 72 and 73 cross the opening 71 parallel to the workbench 1. They are located vertically above each other. The two bolts 72 and 73 are used to connect holes 512 and 522 of the upper and the lower link bar 51 and 52 to the second link support 70. Their distance and relative position is equal to the distance and relative position of bolts 44 and 45 of the first link support 40. So bolts 44 and 45 of the first link support 40 and bolts 72 and 73 of the second link support 70 form the corners of a parallelogram. As shown in FIG. 10, when the second support bar, hinging on bolts 44 and 45 of the first link support 40 moves up and down, the connecting line of bolts 72 and 73 of the second link support 70 stay vertical above each other. Therefore the rotary tool 80 held in the loop 74 maintains a vertical orientation.

As shown in FIGS. 1, 6 and 7, one of the link bars 51, 52 of the second support bar 50 has a fastening pin 53 crossing the link bar perpendicular to its sides. Fastening pin 53 is used to hold one end of the counterforce element 60. Furthermore, the one of the link bars 51, 52 with fastening pin 53 is provided with a groove 54 to accommodate the counterforce element 60, in order to avoid interference with the second support bar 50 while it moves up and down.

The counterforce element 60 works by returning to its original length when compressed, leaving the second support bar 50 upward inclined. The counterforce element 60 may be implemented by a unidirectional compression gas vessel. On each of both ends an eyehole 61, 62 is provided. Eyehole 61 surrounds fastening pin 43 of the first link support 40. Eyehole 62 surrounds fastening pin 53 of the link bars 51, 52 of the second support bar 50. When no force is applied to the counterforce element 60, the second support bar 50 is pushed upward by a certain angle. When the second support bar 50 undergoes downward pressure, the counterforce element 60 between fastening pin 43 of the first link support 40 and fastening pin 53 of the second support bar 50 moves down without interference. At the same time the distance between fastening pin 43 of the first link support 40 and fastening pin 53 of the second support bar 50 decreases, and the counterforce element 60 contracts.

Figure 2:
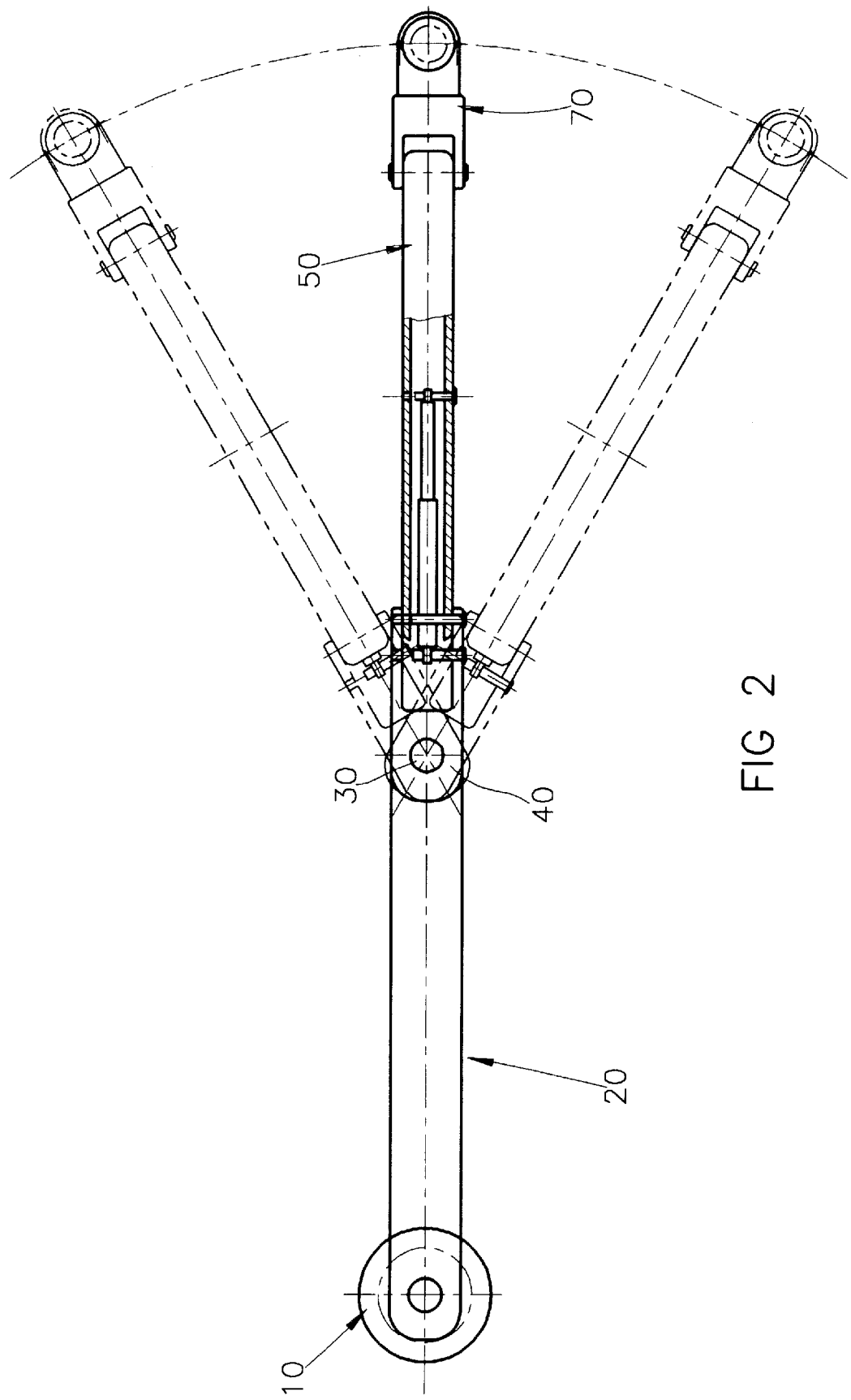
FIG. 2 is a top view of this invention.
Figure 3:
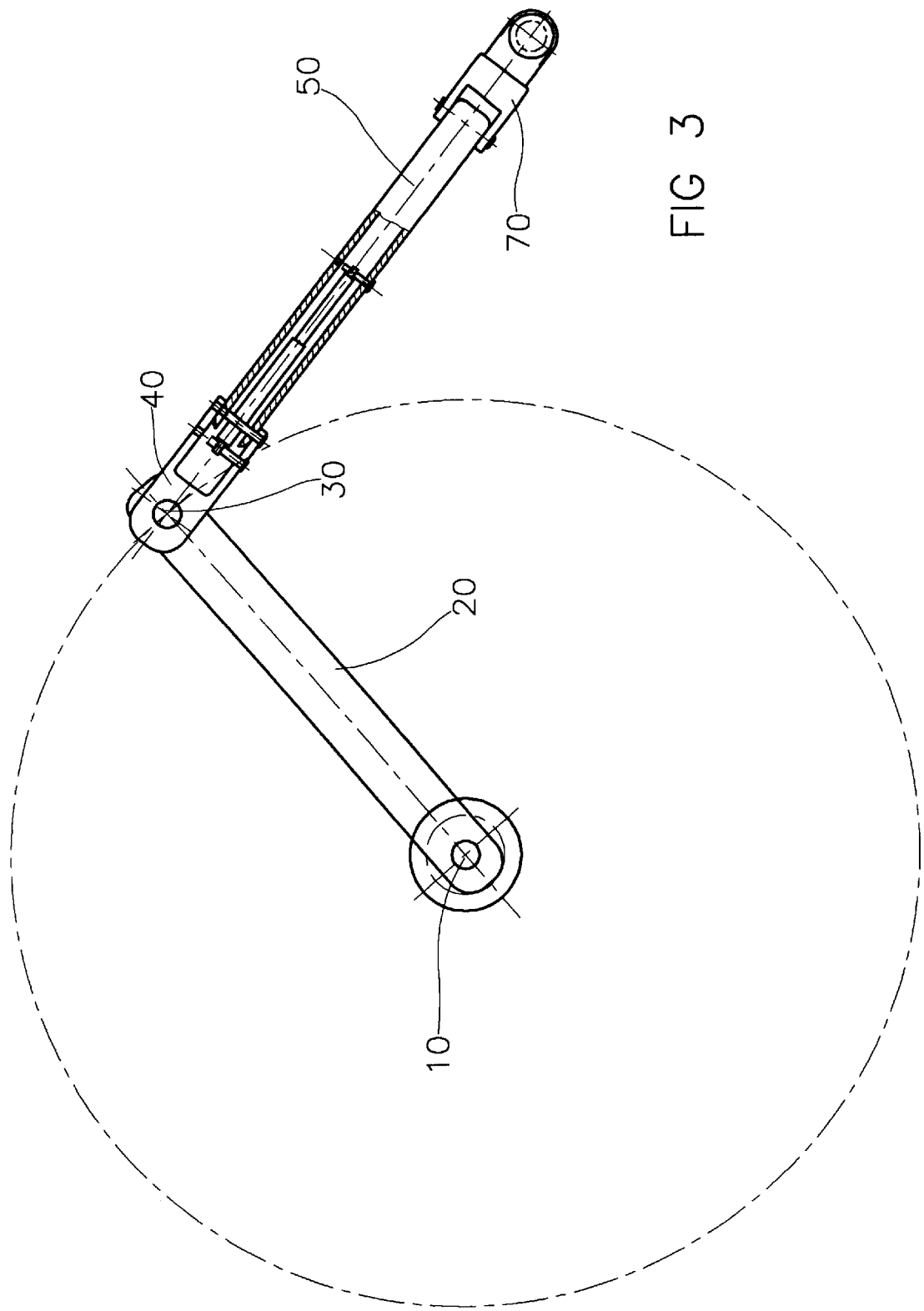
FIG. 3 is a schematic illustration of the horizontal movement of this invention's control arm system to show how the first and the second support bar change their position in a swiveling movement.

As shown in FIGS. 2 and 3, since the first support bar 20 may horizontally swivel around the vertical post 10 by an angle of 360°, and since by way of the vertical rod 30 on the far end of the first support bar 20 the first link support 40 may also horizontally swivel round, the second support bar 50 is able to perform any change in its horizontal position. So the rotary tool 80 will reach any location within the combined radius of the first and the second support bar 20, 50, and there will be almost no blind spot in the working area.

Since there are two support bars moving in the same way, vibrations in the moving direction are effectively damped. So when the position of this invention's control arm system is changed by way of the first support bar 20 swiveling around the vertical post 10 and the first link support 40 swiveling around the vertical rod 30, the vibrations of the work object acting back on the torque of the rotary tool will be mitigated. Thus this invention's control arm system provides full control and stability. Furthermore, when the rotary tool 80 is working vertically, the horizontal shift while moving the second support bar 50 up and down is very small and is easily compensated by a horizontal change of position of the two support bars.

The counterforce element 60, which lets the tool automatically return to its original vertical position, is fixed between the first link support 40 and the second support bar 50. Therefore, when the horizontal working position changes, the length of the counterforce element 60 remains unchanged. Only when the second support bar 50 is pressed down, the counterforce element 60 is contracted. The horizontal shift then is very small and will not cause a marked further contraction. If the length of the counterforce element 60 is initially adjusted, then at any working position the counterforce element 60 will develop a suitable counterforce, saving physical effort while working on a work object.

This invention's control arm system, with its two horizontally swiveling bars put one on another, is assembled very easily. When the parts are to be stored or transported, they are disassembled easily. This saves effort and storage space and facilitates any change of the work place.

Figure 11:
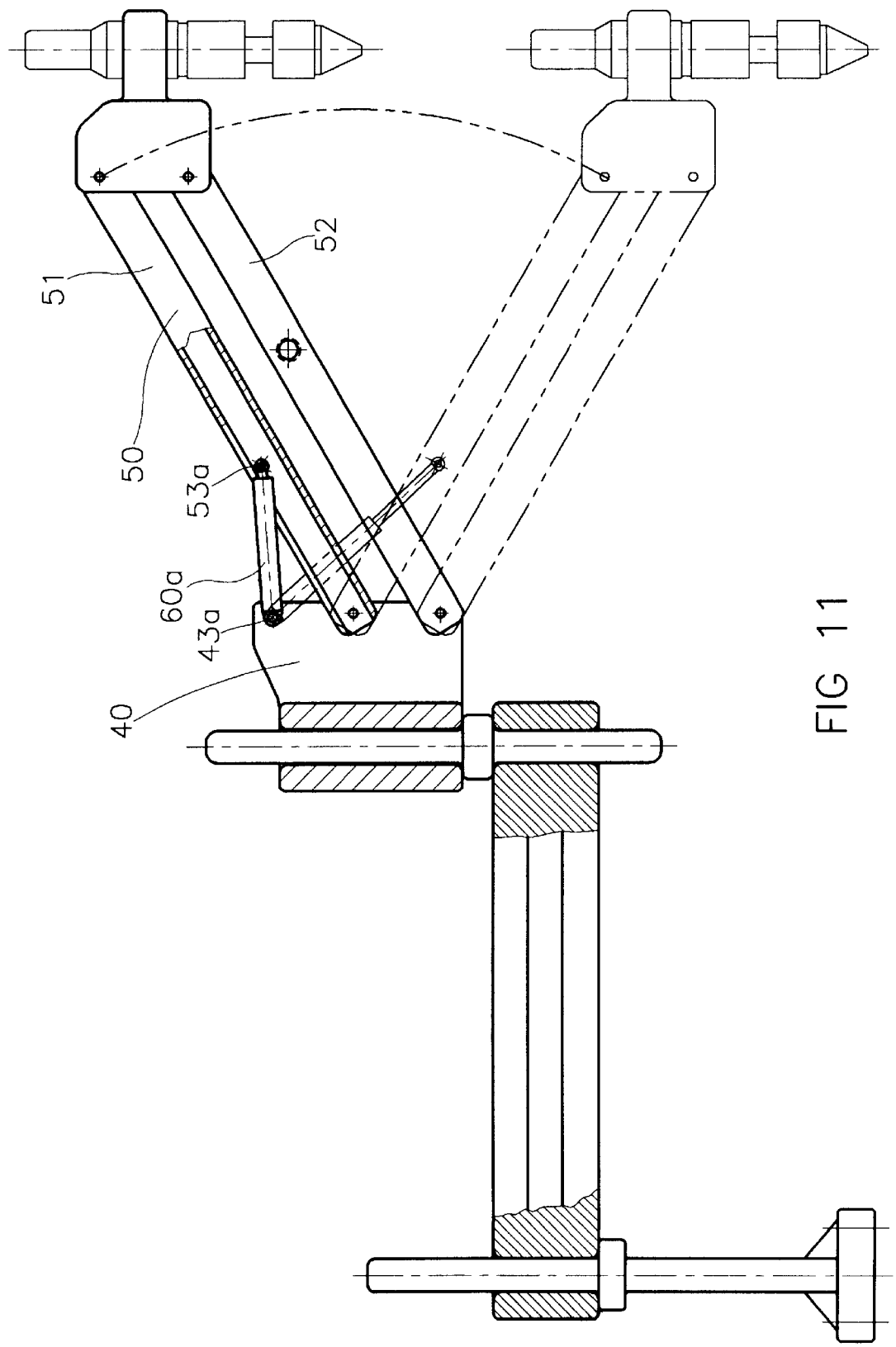
FIG. 11 is a schematic illustration of a second embodiment of this invention.

As shown in FIG. 11, in a second embodiment of this invention, a counterforce element 60a that is implemented as an unidirectional expansion gas vessel is installed instead of the counterforce element 60, which is implemented as an unidirectional compression gas vessel. The counterforce element 60a also has two eyeholes on both ends. One of the eyeholes is passed through by a fastening pin 43a on the first link support 40. The other eyehole is passed through by a fastening pin 53a on one of the link bars 51 or 52 of the second support bar 50. Thereby the effect of causing the second support bar 50 to return automatically to its original vertical position is attained as well.

Figure 12:
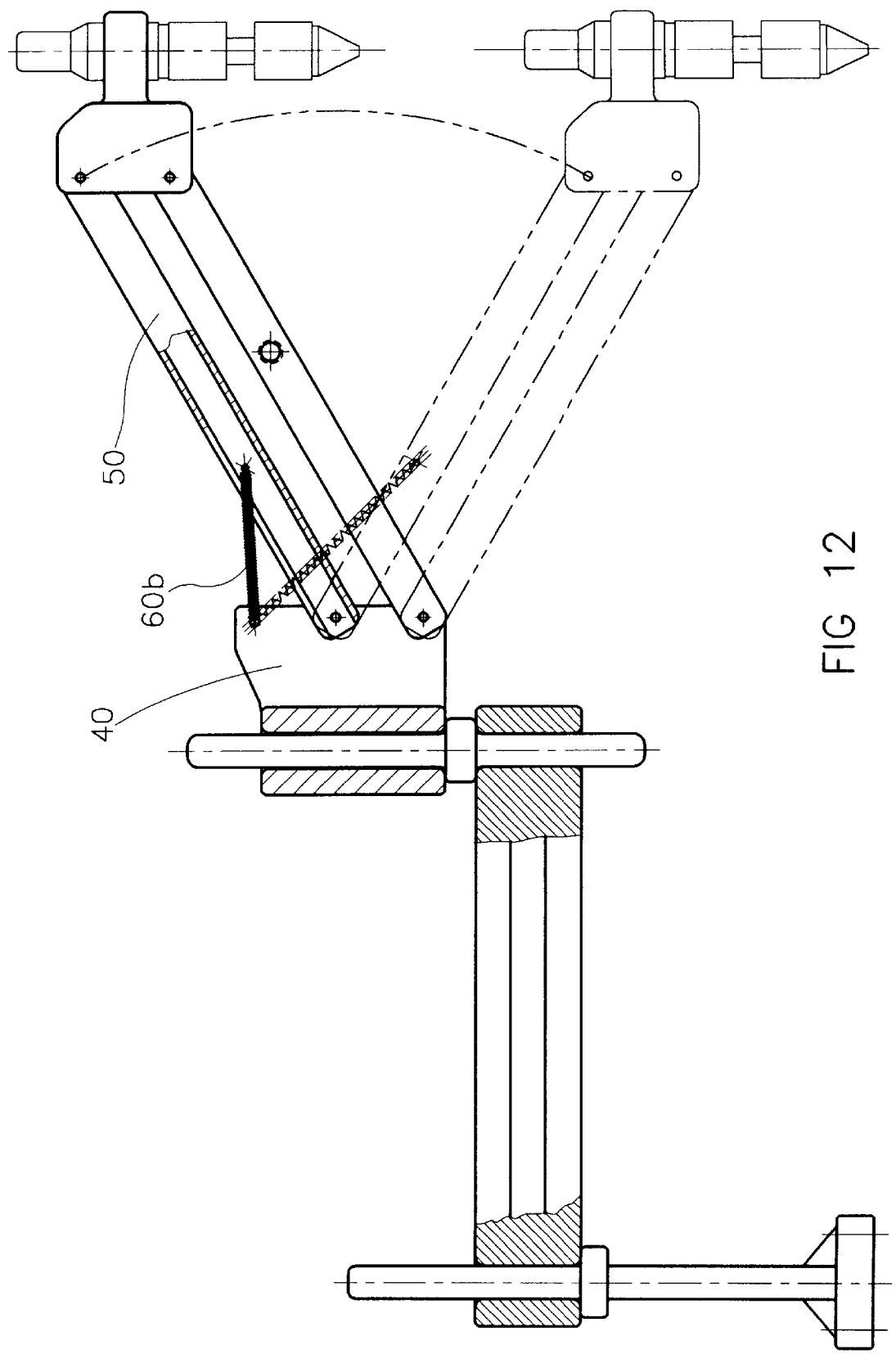
FIG. 12 is a schematic illustration of a third embodiment of this invention.

As shown in FIG. 12, in a third embodiment of this invention, a counterforce element 60b that is implemented as a spring is installed. It causes in the same way the second support bar 50 to return automatically to its original vertical position.

Figure 13:
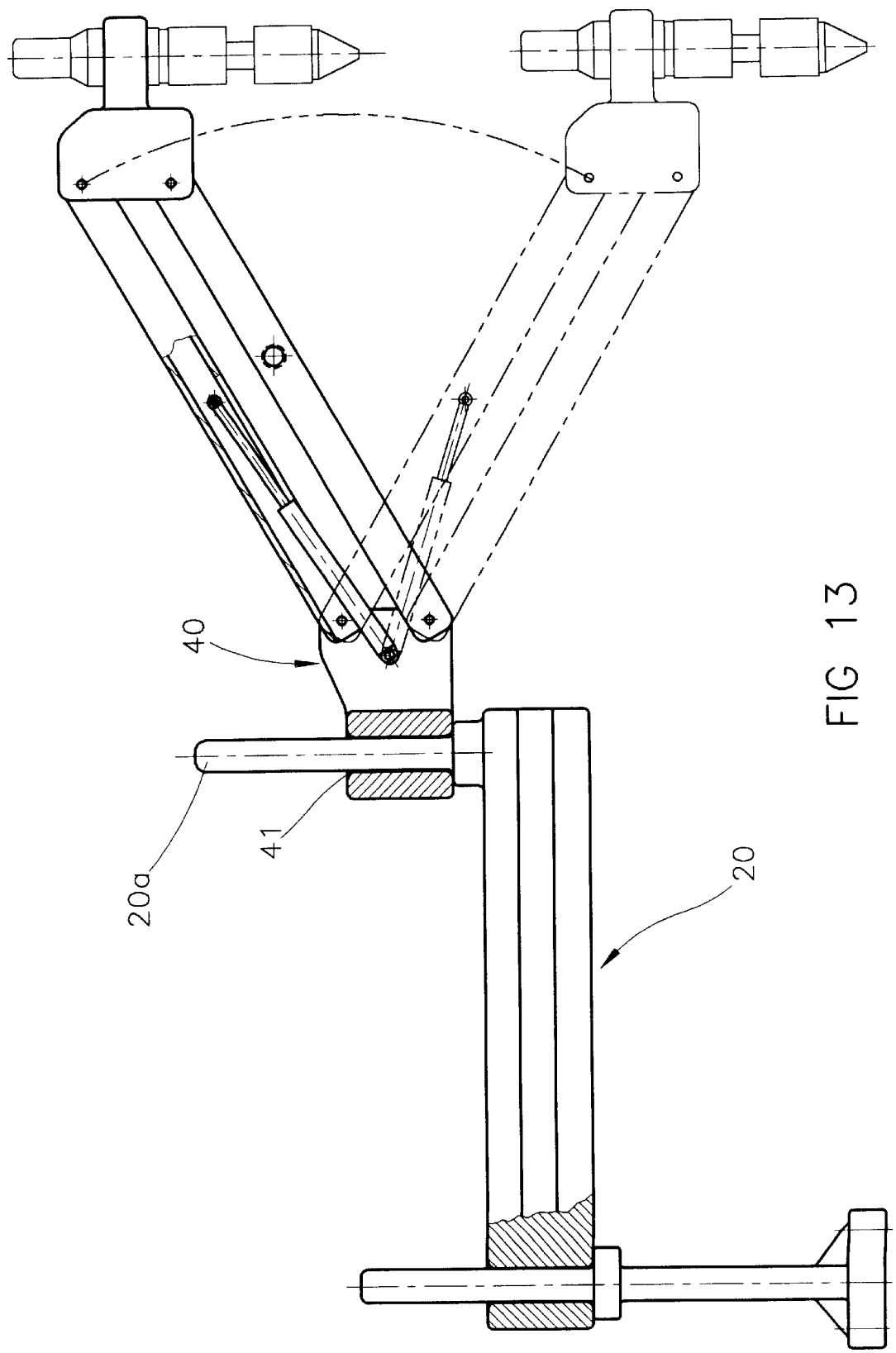
FIG. 13 is a schematic illustration of a fourth embodiment of this invention.

As shown in FIG. 13, in a fourth embodiment of this invention, on the first support bar 20 on the end where it carries the first link support 40, a rod 30a is fastened, extending vertically upwards. The rod 30a passes through hole 41, thus having the same function as the vertical rod 30.

Figure 14:
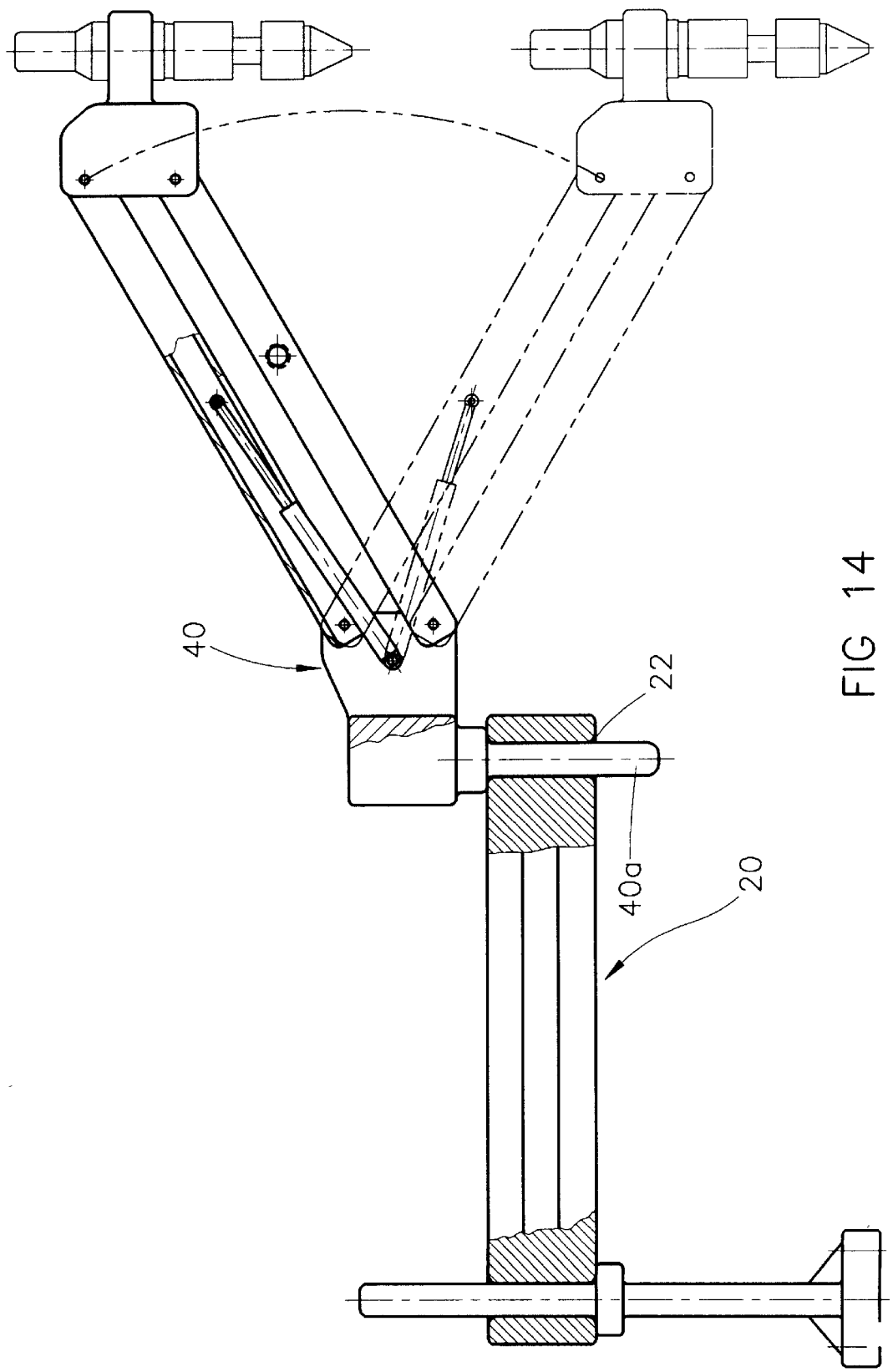
FIG. 14 is a schematic illustration of a fifth embodiment of this invention.

As shown in FIG. 14, in a fifth embodiment of this invention, on the lower side of the first link support 40 a rod 30b is fastened, extending vertically downwards. The rod 30b passes through hole 22 of the first support bar 20, enabling the first link support 40 to turn freely against the first support bar 20.

Figure 15:
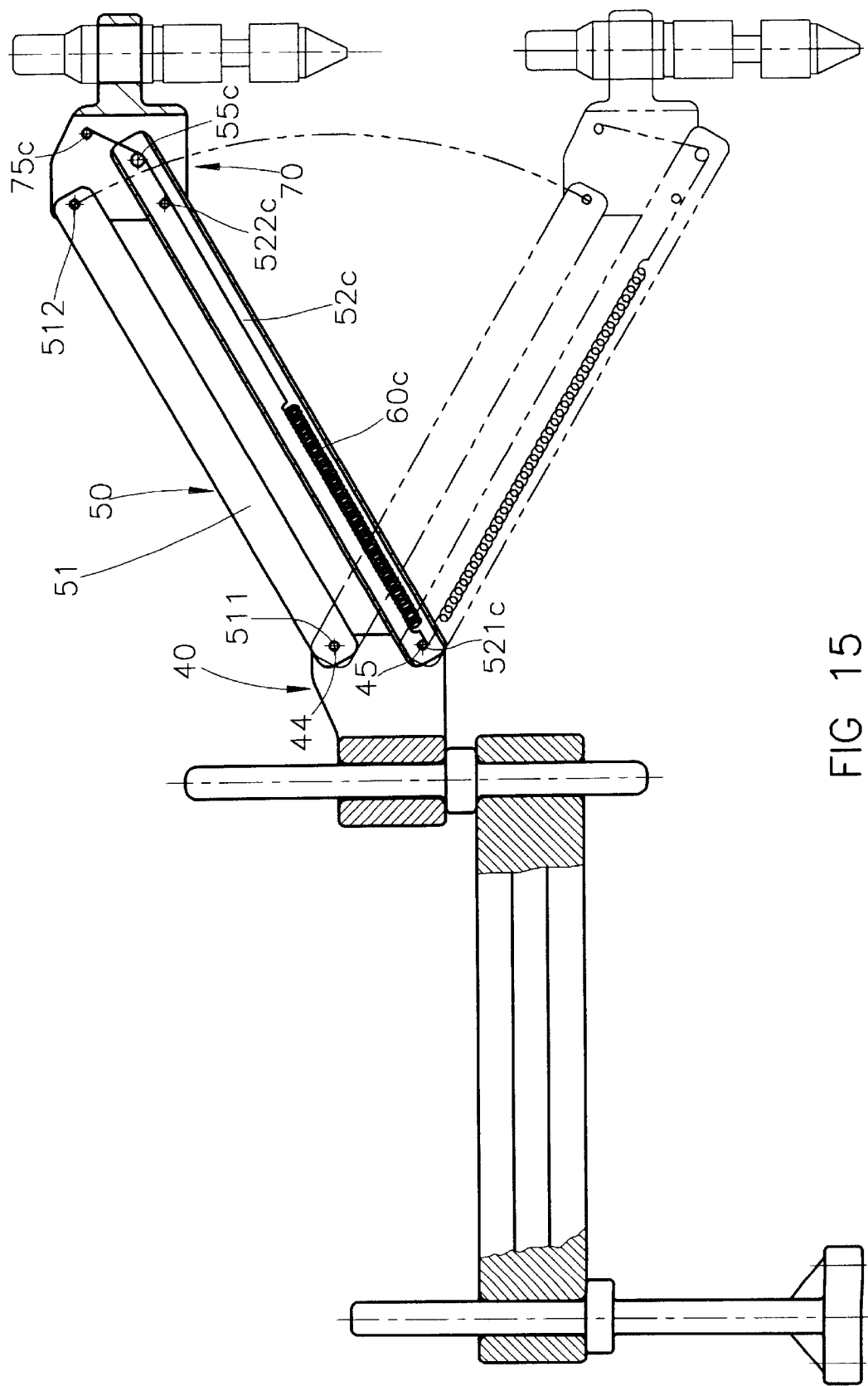
FIG. 15 is a schematic illustration of a sixth embodiment of this invention.

As shown in FIG. 15, in a sixth embodiment of this invention, a lower link bar 52c of the second support bar 50 is installed, which extends further towards the second link support 70, as compared to the lower link bar 52. The lower link bar 52c is also provided with two holes 521c and 522c on both ends, the distance between hole 521c and 522c being equal to the distance of holes 511 and 512. So bolts 44 and 45 of the first link support 40 and bolts 72 and 73 of the second link support 70 still form a parallelogram.

On the end of the lower link bar 52c close to the second link support 70 a reel 55c is mounted. Furthermore, a holder 75c is attached to the second link support 70 to fix the end of a counterforce element 60c. The counterforce element 60c is a spring, whose one end is held by bolt 45 on the first link support 45. The other end of the spring is led around the reel 55c and is fixed by the holder 75c. When the second support bar 50 moves down, by way of a change of its inclination angle the distance between the reel 55c and the holder 75c increases. So the counterforce element 60c is expanded and exerts a counterforce. When the second support bar 50 is no longer pressed down, it returns automatically to its original vertical position.

What is claimed is:

1. A control arm system to hold a rotary tool for work perpendicular to a horizontal workbench comprising:
   a vertical post affixed to and extending upward from said workbench,
   a first support bar extending horizontally from said vertical post, a first end of said first support bar is pivotally connected to said vertical post,
   a vertical rod that pivotally connects said first support bar to a first link support, said link support thereby rotating around said vertical rod,
   a second support bar comprising two parallel link bars of equal length, a first end of each of said link bars is hingedly attached to said first link support, said second support bar moving up and down relative to said first link support,
   a counterforce element, a first end of said counterforce element is pivotally attached to said first link support in a horizontal plane between the horizontal planes of attachment points of said link bars, and a second end of said counterforce element is pivotally attached to one of said link bars such that when downward pressure is applied to said second support bar, said counterforce element is contracted, and when said downward pressure is released, said counterforce element will expand to its original position, thereby urging said second support bar to its original position, and
   a second link support to hold said rotary tool, said second link support is pivotally attached to each of said link bars of said second support bar; wherein
   said rotary tool is moved to any desired position within its range of motion over said workbench via said first support bar pivoting about said vertical post and said first link support pivoting about said vertical rod,
   said second support bar is moved down to move said rotary tool toward said workbench and said second support bar is moved up to move said rotary tool away from said workbench, said counterforce element works to counterbalance weight of said rotary tool and said second support bar; and
   said second link support pivots relative to each of said link bars of said second support bar so as to maintain said rotary tool in vertical alignment relative to said workbench when said second support bar is moved up and down.

2. The control arm system as defined in claim 1 wherein: pivot means of said first support bar comprises self-lubricating bearings.

3. The control arm system as defined in claim 1 wherein: pivot means of said first support bar comprise ball bearings.

4. The control arm system as defined in claim 1 wherein: attachment points of first link support to said second support bar and attachment points of said second support bar to said second link support define corners of a parallelogram.

5. The control arm system as defined in claim 1 wherein: said counterforce element is a unidirectional compression gas vessel.

6. The control arm system as defined in claim 1 wherein: said counterforce element is a unidirectional expansion gas vessel.

7. A control arm system to hold a rotary tool for work perpendicular to a horizontal workbench comprising:
   a vertical post affixed to and extending upward from said workbench, a first support bar extending horizontally from said vertical post, a first end of said first support bar is pivotally connected to said vertical post, a vertical rod that pivotally connects said first support bar to a first link support, said link support thereby rotating around said vertical rod, a second support bar comprising two parallel link bars of equal length, a first end of each of said link bars is hingedly attached to said first link support, said second support bar moving up and down relative to said first link support, a counterforce element, a first end of said counterforce element is pivotally attached to said first link support in a horizontal plane between the horizontal planes of attachment points of said link bars, and a second end of said counterforce element is pivotally attached to one of said link bars such that when downward pressure is applied to said second support bar, said counterforce element is expanded, and when said downward pressure is released, said counterforce element will contract to its original position, thereby urging said second support bar to its original position, and a second link support to hold said rotary tool, said second link support is pivotally attached to each of said link bars of said second support bar; wherein said rotary tool is moved to any desired position within its range of motion over said workbench via said first support bar pivoting about said vertical post and said first link support pivoting about said vertical rod, said second support bar is moved down to move said rotary tool toward said workbench and said second support bar is moved up to move said rotary tool away from said workbench, said counterforce element works to counterbalance weight of said rotary tool and said second support bar, and said second link support pivots relative to each of said link bars of said second support bar so as to maintain said rotary tool in vertical alignment relative to said workbench when said second support bar is moved up and down.

8. The control arm system as defined in claim 7 wherein:

said counterforce element is a spring.

* * * * *